US012761960B2

(12) United States Patent
Romero et al.

(10) Patent No.: US 12,761,960 B2
(45) Date of Patent: Oct. 13, 2026

(54) REDUCING SOLUTION SPACE BASED ON PARTIALLY OBSERVED INFRASTRUCTURE GRAPH SEARCH FOR WORKLOAD PLACEMENT

(71) Applicant: Dell Products L.P., Round Rock, TX (US)

(72) Inventors: Claudio Romero, Rio de Janeiro (BR); Eduardo Vera Sousa, Niterói (BR); Karen Braga Enes, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 424 days.

(21) Appl. No.: 18/484,314

(22) Filed: Oct. 10, 2023

(65) Prior Publication Data

US 2025/0117256 A1 Apr. 10, 2025

(51) Int. Cl.
*G06F 9/50* (2006.01)

(52) U.S. Cl.
CPC .................................. *G06F 9/5027* (2013.01)

(58) Field of Classification Search
CPC ............................. G06F 9/5027; G06F 9/5066
See application file for complete search history.

(56) References Cited

U.S. PATENT DOCUMENTS 9,998,392 B1 * 6/2018 Allen .................... G06F 9/5066
2012/0185867 A1 * 7/2012 Archer .................. G06F 9/5066 718/105
2023/0121060 A1 * 4/2023 Teixeira de Abreu Pinho ............ G06F 9/50 707/798

OTHER PUBLICATIONS

Murai et al., "Selective harvesting over networks," Data Mining and Knowledge Discovery, No. 32, pp. 187-217, 2018.

* cited by examiner

*Primary Examiner* — Larry T Mackall
(74) *Attorney, Agent, or Firm* — Workman Nydegger

(57) ABSTRACT

One example method includes building an infrastructure graph comprising nodes and edges, and each node represents a respective infrastructure, and each edge encodes information about aspects of a network that includes the nodes, applying a selective harvesting (SH) algorithm to the infrastructure graph to identify the nodes that are able to meet the requirements of a workload, and the nodes that are identified collectively form a subset of all the nodes of the infrastructure graph, based on the applying, generating a subgraph of the infrastructure graph, and the subgraph comprises the subset, and applying a workload placement optimization algorithm to the nodes of the subgraph.

20 Claims, 6 Drawing Sheets

REDUCING SOLUTION SPACE BASED ON PARTIALLY OBSERVED INFRASTRUCTURE GRAPH SEARCH FOR WORKLOAD PLACEMENT

FIELD OF THE INVENTION

Embodiments of the present invention generally relate to optimization of workload placement processes. More particularly, at least some embodiments of the invention relate to systems, hardware, software, computer-readable media, and methods, for reducing the size of a search space to be evaluated for optimized workload placement.

BACKGROUND

Cloud computing has gained the attention of businesses because of its benefits, which include pay-per-use computation at the customer side and resource sharing at the service provider side. Through virtualization, the main technology behind clouds, it is possible to abstract a pool of computation devices and offers computational resources better tailored to customer needs, who might contract more computation as their needs grow. In this environment, other resource abstractions emerged, the most prominent example being containers. It is also possible to offer computation without the explicit necessity of the customer to know which underlying infrastructure is running its code. This can be achieved in the Platform as a Service (PaaS) paradigm and also the Function as a Service (FaaS, serverless computing) paradigm.

In each of these paradigms, using an infrastructure efficiently to execute jobs implies the adoption of a workload, or dataset, placement approach. While there are multiple approaches that target this type of problem, at its core, it is an optimization problem that seeks to find the most efficient placement while respecting multiple restrictions such as, for example, GDPR compliance, workloads that have resource sharing restrictions, fixed location datasets, and constraints such as infrastructure resources including available memory, number of CPU cores, presence/absence of GPUs, and number of GPUs, and data availability, that is, which datasets are available in each node.

Infrastructures may be mapped as graphs, where nodes of the graph represent virtual computing instances, and edges represent the path to be taken to get from one node to another, from the connectivity aspect. The optimization problem to find the best node for the placement of a workload requires an exhaustive search in an infrastructure graph. For large graphs, which may have thousands, or more, nodes the complexity of the search makes the optimization process unfeasible, even for some computing entities.

BRIEF DESCRIPTION OF THE DRAWINGS

In order to describe the manner in which at least some of the advantages and features of various example embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, these embodiments will be described and explained with additional specificity and detail through the use of the accompanying drawings.

DETAILED DESCRIPTION OF SOME EXAMPLE EMBODIMENTS

Figure 1:
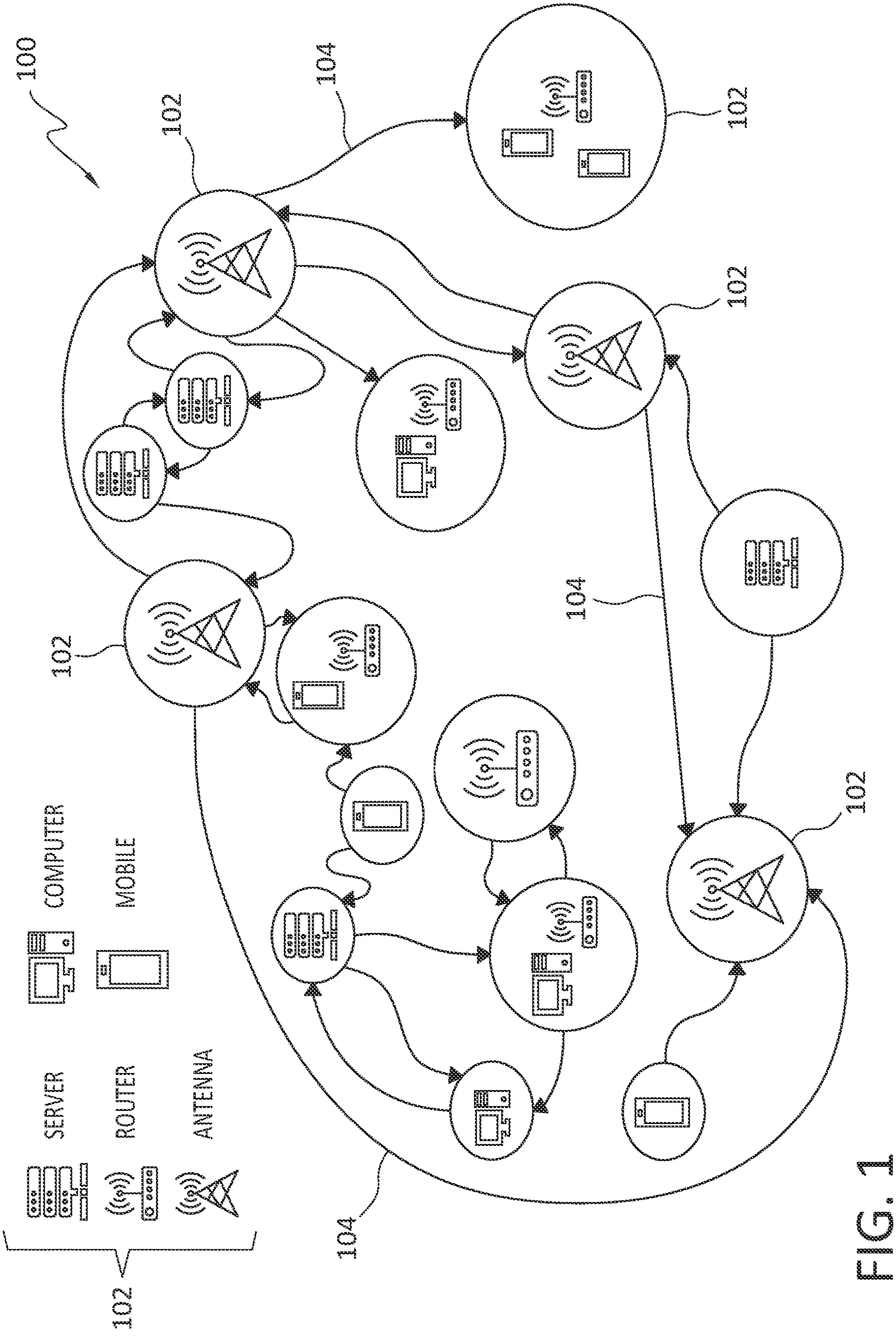
FIG. 1 discloses aspects of a heterogenous wireless graph with mobile devices of multiple interfaces connected simultaneously.

Embodiments of the present invention generally relate to optimization of workload placement processes. More particularly, at least some embodiments of the invention relate to systems, hardware, software, computer-readable media, and methods, for reducing the size of a search space to be evaluated for optimized workload placement.

One example embodiment is directed to a method that, in general, comprises building an infrastructure graph, then applying an algorithm to search for nodes in a portion of the infrastructure graph, and then applying a workload placement optimization algorithm in the reduced search space, that is, the portion of the infrastructure represented by the infrastructure graph.

With particular reference to construction of the infrastructure graph, an infrastructure graph according to an embodiment may comprise nodes, edges and attributes of nodes and edges as a heterogeneous graph. Each node may represent a different respective infrastructure. Further, each node may have a set of attributes made up of various different types of features such as, but not limited to: [1] infrastructure resources—such as available memory, number of CPU (central processing unit) cores, presence/absence of GPU (graphics processing unit), number of GPUs, and others; [2] topology information—such as node centrality, representing the topological importance of a node, normalized degree (number of available neighbors), component size (size of the of the component where the node belongs), and clustering coefficient (local neighborhood density of a node); and [3] data availability—that is, which datasets are available in each node. Further, each edge of the infrastructure graph is directed to the nodes that have a direct connection in the network. Each edge encodes the information about the network aspects, such as latency and bandwidth, for example.

With regard to application of the algorithm to search for nodes, the problem of searching for specific nodes in partially unknown networks topologies under a query budget constraint is called Selective Harvesting (SH). In this stage, an embodiment may apply an SH algorithm starting from a random set of nodes of the infrastructure graph. An embodiment may define a budget referring to at least the number of nodes consistent with the size of the workload that must be allocated to infrastructures. Finally, the SH algorithm may return a subgraph, that is, a subset or portion of the infrastructure graph, in which all nodes satisfy the minimum requirements of the workload.

Finally, the optimization algorithm, for placement of the workload, is applied in the reduced search space. In this stage, an embodiment applies the optimization algorithm in the subgraph generated by the SH solution algorithm. Application of the optimization algorithm may result in identification of a node, or nodes, in the reduced search space that are able to support the requirements of the workload. This may be a particularly useful aspect of an embodiment, inasmuch as an infrastructure may comprise hundreds, thousands, tens of thousands, or more, nodes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the size of the space to be searched for optimized placement of a workload may be reduced to some size smaller than the entire infrastructure, thus reducing the time and resources needed to support performance of a workload placement optimization process. An embodiment may provide assurance that a workload placement optimization process can be successfully performed in a given subspace of an infrastructure. Various other advantages of one or more example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for an Example Embodiment

The following is a discussion of a context for an example embodiment. This discussion is not intended to limit the scope of the invention, or the applicability of the embodiments, in any way.

A.1 Graphs

As used herein, graphs comprise mathematical structures used mainly to represent relationships, as edges, between entities which may be represented as vertices or nodes. These structures can be used to model many problems. In many of these applications, the vertices, or nodes, of a graph can contain valuable information about the entities being modeled on these structures. This set of information about the modeled entities may be referred to as node attributes. In addition, the vertices of a graph may have special characteristics, that is, labels, labels, which may make those vertices a possible target for some tasks.

A.2 Heterogenous Networks

Homogeneous networks are networks where nodes and edges have a single meaning. For example, in a scientific collaboration network, every node represents a researcher while edges represent a collaboration in a scientific work. Another example is web crawling, where the nodes represent web pages only and edges represent hyperlinks only. FIG. 1 illustrates an example of a heterogeneous network 100 with different types of nodes 102. Particularly, FIG. 1 discloses a heterogeneous network 100 in the form of a heterogenous wireless communication graph with nodes 102 in the form of mobile devices of multiple interfaces connected simultaneously. The edges, some of which are denoted at 104, indicate a connection of some type between nodes 102.

Although most research has focused on homogeneous networks, there is a recent increase in interest in heterogeneous networks. In it, nodes and edges may carry multiple meanings and types because entities and relationships are not necessarily the same across the domain that is being modelled. For example, a node in a referral network may carry labels such as 'server,' 'router,' 'computer,' 'mobile,' 'antenna' and others. Edges might mean 'node a is connected to node b', or 'node a has access to node b,' for instance.

A.3 Search in Graphs

In general, search in graphs refers to the process of traversing a graph, a subgraph, or a set of interconnected nodes in order to find one or more specific nodes and/or paths, or edges. Graph search refers to a class of algorithms that systematically explore the nodes and edges of a graph, computing various properties.

In many real networks, searching in a graph or accessing data associated with nodes and edges of the network is often difficult and querying nodes can have a steep cost in terms of the consumption of resources such as processing and bandwidth. In these scenarios, it is often the case that a large fraction of the data to be modeled is unobserved, and there is only a limited budget available to perform queries. Moreover, there may not be interest in the complete network, but only in a set of target nodes, that is, node with certain characteristics.

As an example, consider the problem of finding as many Facebook users that share a particular taste in music as possible, starting from a friendship network of a specific user. Hereupon, Facebook users are nodes, friendship status are edges and musical tastes are user attributes. Except for the Facebook engineers themselves however, access to the networks is limited and it is impossible to query all nodes.

A.4 Selective Harvesting Search Problem

The problem of finding the largest number of target nodes for partially unknown networks topologies under a query budget constraint is called SH (Selective Harvesting). SH can be stated as a graph search problem on partially observed network topology. However, due to the inherent complexity of the addressed problem, SH can be framed from other perspectives, such as an unbalanced data classification problem, a reinforcement learning task, or as an anomaly detection problem, to enumerate a few.

In SH, data is acquired through an online search or exploration of the graph, which can be seen as an evolving process that increases knowledge about the network as the search expands. At each step, structural and non-structural information regarding topology, nodes and edge data is acquired. Since the networks are partially observed in SH, the set of queried nodes and their connections to the rest of the network compose all available information about the network.

Any algorithm that solves SH presents itself as a solution for a search problem into partially observed graphs. The main difference between these methods is how they choose which node to explore next. For example, D3TS uses an approach based on reinforcement learning in a set of models in order to estimate which node has the largest probability to belong to the target class.

Figure 2:
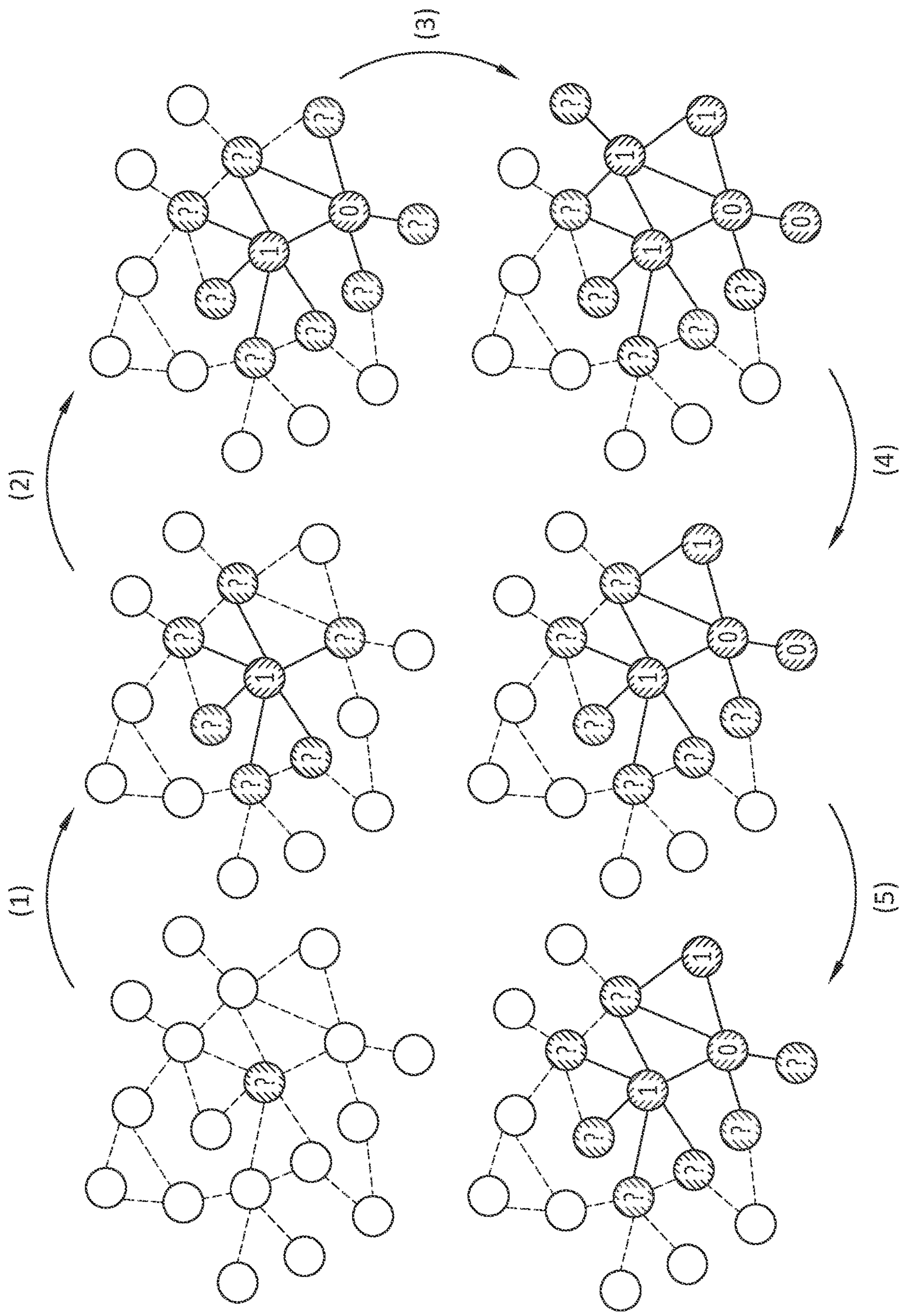
FIG. 2 illustrates an example in which consecutive steps of an generic algorithm solve a selective harvesting search problem.

FIG. 2 illustrates five consecutive steps (1)-(5), or stages, of a generic algorithm that solves an SH search problem. In particular, the generic algorithm of FIG. 2 solves a selective harvesting search problem. In FIG. 2, black, gray and white colors represent queried, unqueried and unknown nodes, respectively. Unqueried nodes are candidate nodes to be queried because they border with at least one queried node. Nodes that have no connections to queried nodes are unknown until they get at the border and, thus, become unqueried. Solid and dashed lines represent known, and unknown, edges, respectively. Further, "1" indicates target nodes and "0" indicates non-target nodes. Nodes marked with "?" indicate an unknown label.

With continued reference to the example of FIG. 2, a generic algorithm that solves an SH search problem may work as follows. Given an initial input graph $G_0$, an SH generic algorithm must decide at each step t=1, . . . ,B what action to take, that is, what fringe node v E $W_t$ to query, given the currently available network information. This action returns v's label, attributes and connections, which is included as additional input to the search in step t+1. Node v's label (0 or 1) can be thought of as the 'payoff' obtained by querying that node. The output of the algorithm is the list of target nodes found in B steps. The best algorithm is the one that yields the largest total payoff, that is, yields the largest number of target nodes. The stopping criterion is reached when the total budget (B steps) is reached.

B. Overview of an Example Embodiment

An example embodiment may define an infrastructure graph as a partially observed graph where a large fraction of the data to be modeled is unobserved, and there is only a limited budget available to perform queries to solve the workload placement problem. In this sense, a method may be applied to search for partially unknown networks topologies under a query budget constraint to find a subgraph where the number of nodes is equivalent to the budget size and all nodes satisfy the resource and data constraints needed for workload placement. Thus, an example embodiment may address the following concerns:

1. modeling an optimization problem of workload placement in an infrastructure graph as a partially observed graph search problem;
2. finding a subgraph in an infrastructure graph composed of nodes that satisfy the workload requirements—this subgraph does not necessarily contain the optimal number of nodes to run the workloads, in fact, it would most likely contain more nodes than necessary—however, the optimization may then only be executed in this subgraph instead of looking at the complete graph; and
3. enable the optimization process of finding the most efficient placement while respecting multiple restrictions and constraints.

In light of the foregoing points, an embodiment may represent the infrastructure and its current state, which workloads or datasets are present in each node as well as which restrictions currently apply to each node, as a partially observed graph. In addition, an embodiment may comprise a method that leverages this graph representation to find a subgraph that contains the solution to the optimization problem, effectively reducing the optimization space, and therefore reducing the execution time of the optimization algorithm.

One way to look at this solution is to consider that, instead of looking to the entire network during the optimization process and consider all the nodes as candidates for placement, apply a selective harvesting solution and select the subset of nodes that cope with all the restrictions. Notice that this subset may be much smaller than the entire network, but still satisfies all the requirements of the workloads. Thus, this pruned set of nodes comprises, or consists of, the nodes that must be used for the optimization process, which considerably reduces the optimization cost.

One example embodiment may be considered as having the form of a pipeline that comprises three steps or stages, namely:

Step 1: Build the Infrastructure Graph

The infrastructure graph is composed of nodes, edges and attributes of nodes and edges as a heterogeneous graph.

Each node represents one different infrastructure, and each node has a set of attributes made up of various different types of features, specifically:

- infrastructure resources: available memory; number of CPU cores; presence/absence of GPUs; number of GPUs; and others;
- topology information: node centrality (represents the topological importance of a node); normalized degree (number of available neighbors); component size (size of the of the component where the node belongs); clustering coefficient (local neighborhood density of a node); and
- data availability: which datasets are available in each node.

Each edge is directed to the nodes that have a direct connection in the network, and each edge encodes the information about the network aspects, such as latency and bandwidth.

Step 2: Apply an Algorithm for Search Nodes in Partially Observe Graphs

The problem of searching for specific nodes in partially unknown networks topologies under a query budget constraint is called Selective Harvesting (SH).

In this step, we apply an SH algorithm starting from a random set of nodes of the infrastructure graph. We define a budget referring to at least the number of nodes consistent with the size of the workload that must be allocated to infrastructures.

SH algorithm returns a subgraph in which all nodes of the subgraph satisfy the minimum requirements of the workload.

Step 3: Apply the Optimization Algorithm in the Reduced Search Space

In this step, the optimization algorithm is applied in the subgraph generated by the SH solution algorithm.

As apparent from this disclosure, an example embodiment, which may comprise a pipeline that enables the feasibility of optimization methods in a workload placement scenario, may possess a variety of useful aspects and features, although no embodiment is required to have any of such features and aspects. For example, an embodiment of the invention may differ from conventional approaches for workload placement at least insofar as that embodiment comprises a pipeline to reduce the optimization search space for workload placement problems. Thus, some example features and aspects of an embodiment comprise:

- Leveraging the modeling of infrastructure graphs as partially observed structures, enabling the application of any SH algorithm on nodes that contains relevant features for the workload placement tasks, to create a pruned search space which contains candidate nodes to place the workloads.
- Providing a pruned search space for any desired workload placement optimization method, in which each and all nodes in the pruned search space satisfy the minimum requirements of the workload.
  - Once SH algorithms model the search problem as binary classification problem, an embodiment may ensure that a node will be added to the expanding network if, and only if, that nodes belongs to the desired class, that is, the class that represents or includes the nodes that contain the minimum requirements for running the workload.

C. Detailed Discussion of an Example Embodiment

Figure 3:
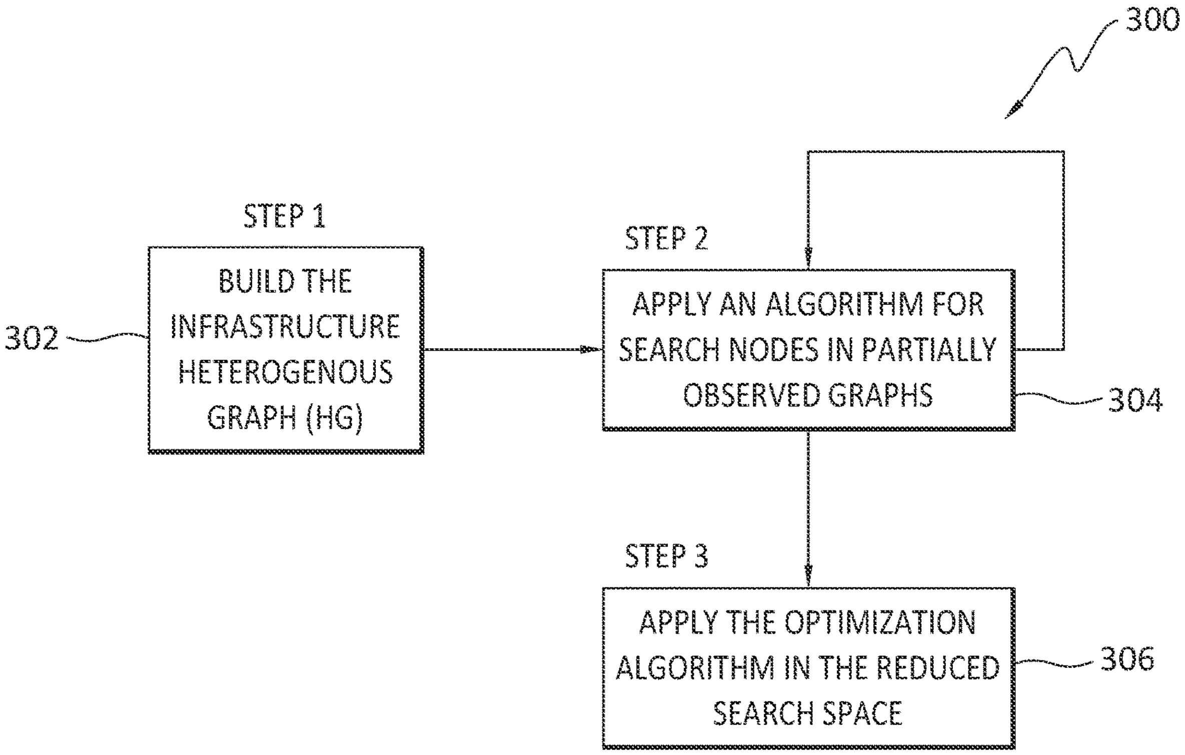
FIG. 3 is a flow diagram directed to a method according to one embodiment.

With reference now to FIG. 3, details are provided concerning an a method 300 according to one example embodiment. In particular, FIG. 3 discloses a high-level diagram depicting a three-step process. In general, after the infrastructure heterogenous graph (HG) is built 302, the search 304 over the partially observed network (Step 2) iteratively occurs by applying an SH solution algorithm to expand the infrastructure subgraph while the budget allows. Then, the optimization algorithm may be applied 306 in the resulting reduced search space.

The following discussion of the method 300 and its constituent elements is subdivided into three parts, the first part explains use of a pruning process of a state space. The second part is concerned with the modelling of an infrastructure network as a Heterogenous Graph (HG) or Heterogenous Network (HN), such as is indicated at 302 (Step 1) in FIG. 3. Finally, the third part presents an orchestration process 304, 306 (Steps 2 and 3) of FIG. 3.

C.1 Pruning Process

Figure 4:
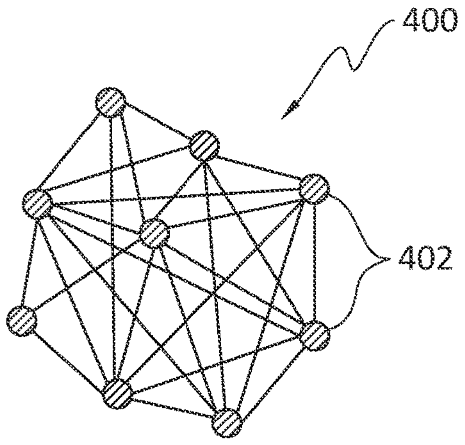
FIG. 4 discloses an example infrastructure graph G=(V, E) with candidate nodes to execute a set of workloads W.

Reference is first made to FIG. 4, which discloses an example of infrastructure graph G=(V, E) 400 with candidate nodes 402 to execute a set of workloads W. The placement plan may be built using a generic method M. That is, the graph G represents an infrastructure, W is a set of workloads that need to be placed in this infrastructure and M is an optimization method for building a workload placement plan. In an embodiment a pruning process is performed on the state space, using a generic SH algorithm, to improve the feasibility of applying a user-predefined optimization method. By doing so, an embodiment may restrict the space, that is, the size of the space to be considered when performing a workload placement optimization process, and this space restriction or reduction may reduce the cost of performing that optimization workload placement process. It is noted that an embodiment may consider any algorithm that solves the HS problem as well as the chosen optimization method.

Figure 5:
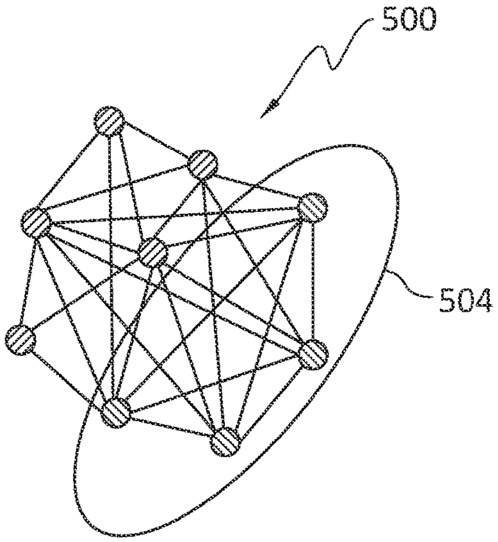
FIG. 5 discloses an example of an infrastructure graph G=(V, E) with highlight on subgraph G'=(V', E'), which is the output of a method according to one embodiment.

With attention now to FIG. 5, there is disclosed an example infrastructure graph G=(V,E) 502 with highlight on subgraph G'=(V', E'), which is the output of a method according to one embodiment. In particular, consider now that only a subset of nodes V', collectively depicted at 504 in FIG. 5, where |V'|<<|V|, are enough to cope with the constraints of all workloads. Note however, that the subgraph found G'=(V', E') is not the optimal workload placement plan yet. However, an embodiment may rely on considering G'=(V', E') for the workload placement optimization process, which could potentially reduce the cost of the workload placement optimization process by reducing the search space while coping with the constraints of each workload. One example embodiment may be particularly concerned with finding G'.

C.2 Infrastructure Heterogenous Graph

In the first step 302 (see FIG. 3), an embodiment may model the infrastructure networks as a heterogeneous graph, where nodes and edges carry multiple types of information. For a workload placement scenario, each node of the infrastructure network represents an allocation point for one or more workload tasks. In this sense, an embodiment may thus define and specify relevant information that nodes and edges must carry to the heterogenous graph to enable the allocation of tasks.

As disclosed earlier herein, some relevant attributes may be defined for the for nodes and edges. In one scenario, the most relevant node attributes are of three types, and the most relevant edges attributes are of two types. For this example, these attributes are summarized as follows:

1. Node Attributes

- Infrastructure resources: available memory; number of CPU cores; presence/absence of GPUs; number of GPUs; and others.
- Topology Information: node centrality (represents the topological importance of a node); normalized degree (number of available neighbors); component size; clustering coefficient (local neighborhood density of a node);

Data Availability: which datasets are available in each node.

2. Edge Attributes

Latency: represents the time it takes for data to be transferred over the network.

Bandwidth: refers to the transmission capacity of a network, related to the speed at which data passes through this specific network.

Figure 6:
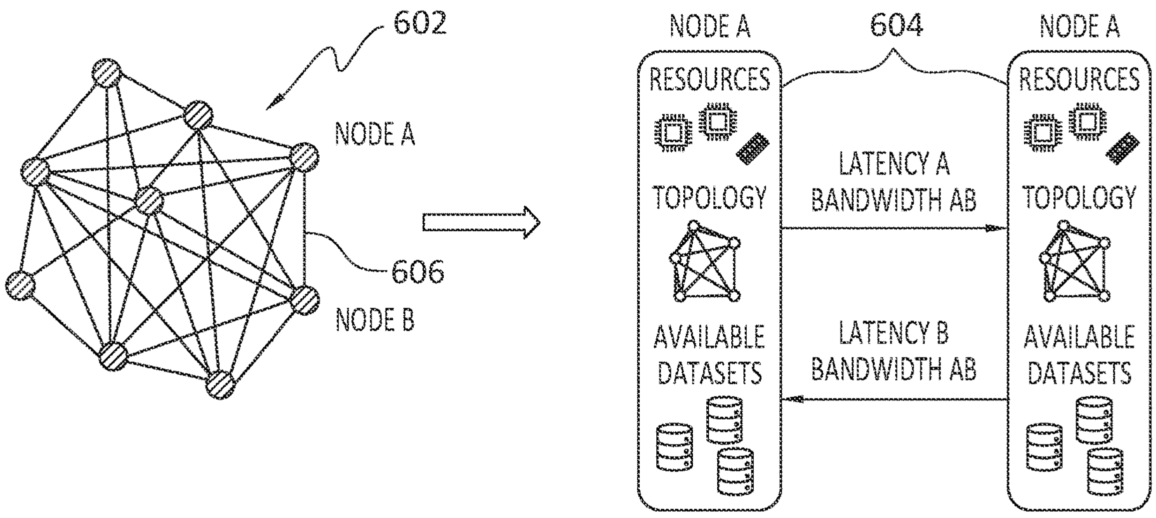
FIG. 6 discloses an infrastructure network, and detailed information concerning two nodes of the infrastructure network, according to one embodiment.

The infrastructure scenario is directly related to the attributes for nodes and edges. Different infrastructure implies in different sets of attributes. FIG. 6 illustrates an example of two connected nodes, Node A and Node B, in an infrastructure 602 where both nodes and edges have multiple types of information. Detailed information 604 is also disclosed for each of the nodes. For example, Node A and Node B each carry information regarding: (i) computational resources such as CPU and GPU quantity and/or usage; (ii) topological features, which includes number of edges, local centrality; and (iii) datasets availability. Furthermore, edges, such as the edge 606, in the example of FIG. 6 may contain link bandwidth and latency information. The example of FIG. 6 thus depicts how, in an embodiment, the semantics in a heterogenous network can be useful during the search process of a workload placement scenario.

C.3 Orchestration Process

Figure 7:
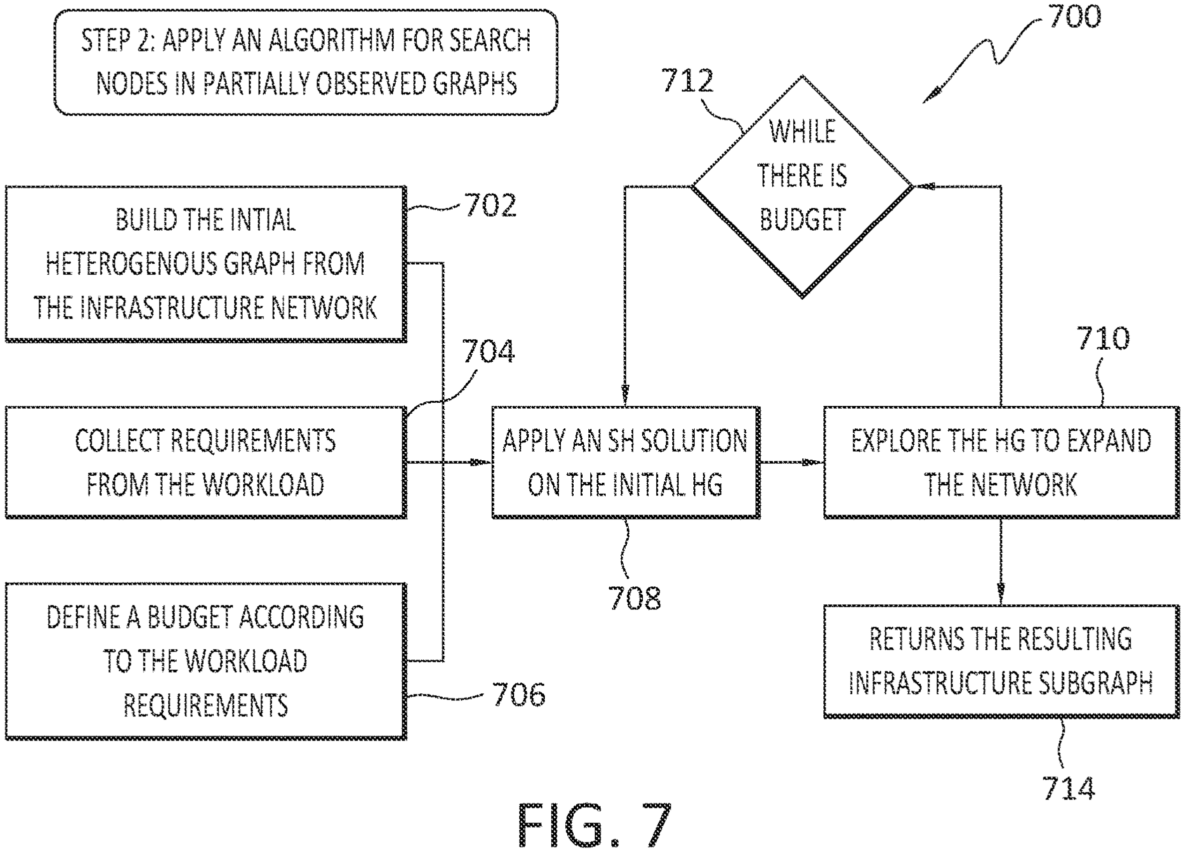
FIG. 7 discloses a method for identifying an infrastructure subgraph, according to one embodiment.

In an embodiment, an orchestration process starts with the user making a request to execute a specific workload and comprises 304 (Step 2) and 306 (Step 3) from FIG. 3. After the user request, the process may take place without any kind of visibility for the user. FIG. 7 discloses an example implementation of the aforementioned process 304 (Step 2) of FIG. 3. Particularly, FIG. 7 discloses the application of an algorithm 700 for searching for nodes in partially observed graphs.

Step 2, or the algorithm 700, may begin immediately after the orchestrator has built the infrastructure heterogenous graph, and after receiving a request from a user. To perform a search procedure over a partially observed network, that is, the algorithm 700, various pieces of information may be needed:

1. 702—an initial infrastructure subgraph referred to as a 'cold start';
2. 704—the minimum requirements needed to execute the workload; and
3. 706—a defined budget corresponding to the maximum number of graph expansions, or the maximum number of SH algorithm iterations.

The cold start set corresponds to a minor sample of the infrastructure network, that is, a sample of less than the entire infrastructure network, collected to build an initial HN (heterogenous network). This initial subgraph may be built as a simple random walk in the infrastructure, or it could be a pre-selected set of nodes.

In an embodiment, the pre-selected set of nodes corresponds to a sample that involves two different types of nodes, namely, some nodes that satisfy the minimum requirements to run the workload, and some nodes that do not satisfy those minimum requirements. This may be important since some algorithms that solve the SH search problem model this search on the partially observed graph as a binary classification problem, that is, as a decision problem. In an embodiment, the nodes of a specific class are discovered, that is, that class of nodes that satisfies minimum requirements for running the workload.

After defining the search budget 706, an embodiment may then apply 708 an SH algorithm on the initial HG (heterogenous graph) that models the infrastructure network. Next, a process may be performed that comprises searching the subgraph and expanding the HN (heterogeneous network) 710. The selected SH algorithm may train a learning model using the cold start set of nodes and the features of the nodes that satisfy or not the workload execution prerequisites. Then, the algorithm 700 may proceed to an inference phase where the trained model should select from the unqueried set of nodes which of them belongs, with the highest probability, to the class of nodes that can execute the workload. This process 708/710 iterates one node at a time until it is determined 712 that the budget has run out.

After the end of the search process, the framework returns 714 the resulting subgraph to the orchestrator. By doing this, an embodiment reduces a size of the search space, from the complete graph to the generated subgraph, for the optimization algorithm. It is noted that the execution of the learning algorithm 700 that is a solution for the SH may guarantee that a node will only be added to the expanding network if, and only if, that node satisfies the minimum requirements of the workload. Thus, after the budget depletes, the expanded network has nodes that, except for the cold start, are known/determined to meet the minimum requirements for executing the workload. Moreover, note that the higher the budget, the larger the resulting HN becomes, since a node may be added to the HN with each iteration of 708/710.

Figure 8:
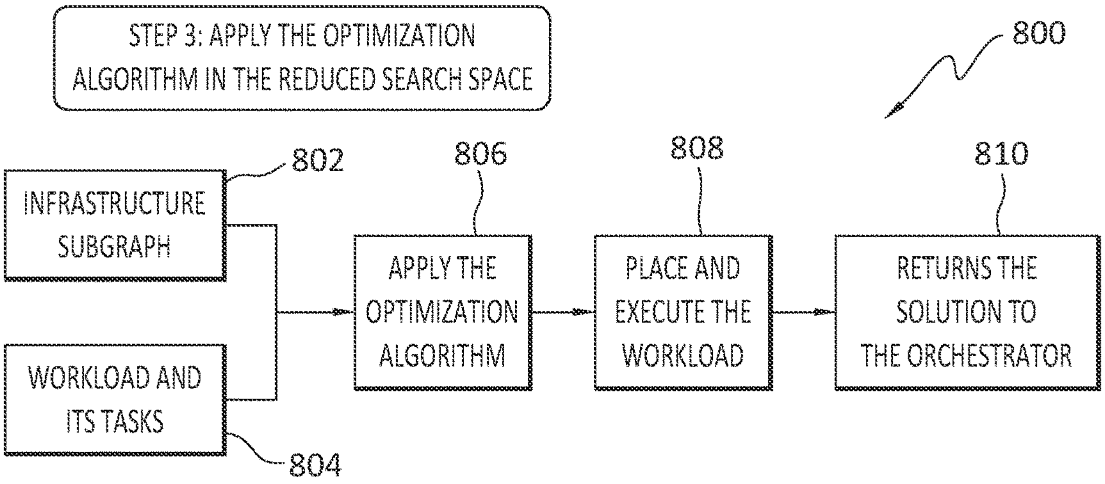
FIG. 8 discloses a method for applying an optimization method in a reduced search space, according to one embodiment.

After generating the subgraph (see 714 in FIG. 7), an embodiment may be able to proceed with the application of the optimization algorithm for workload placement. FIG. 8 presents an example diagram for Step 3 of the example disclosed in FIG. 3. Particularly, FIG. 8 discloses a method 800 for application of an optimization method M in the reduced search space. In the method 800, the orchestrator receives the infrastructure subgraph 802 generated in Step 2, and the workload and its tasks 804 to be placed. An optimization algorithm may be applied 806 to identify the best node to apply each of the tasks of the workload. Since the search space has been reduced, by applying the SH algorithm to generate the subgraph, the optimization algorithm may only consider the generated subgraph, and not any infrastructure nodes outside of that subgraph, which makes the cost of running the optimization algorithm more feasible for the workload placement task. After the placement and the execution of the workload 808, the framework returns the solution to the orchestrator, which in turn returns 810 the execution result to the end user.

D. Example Methods

Figure 9:
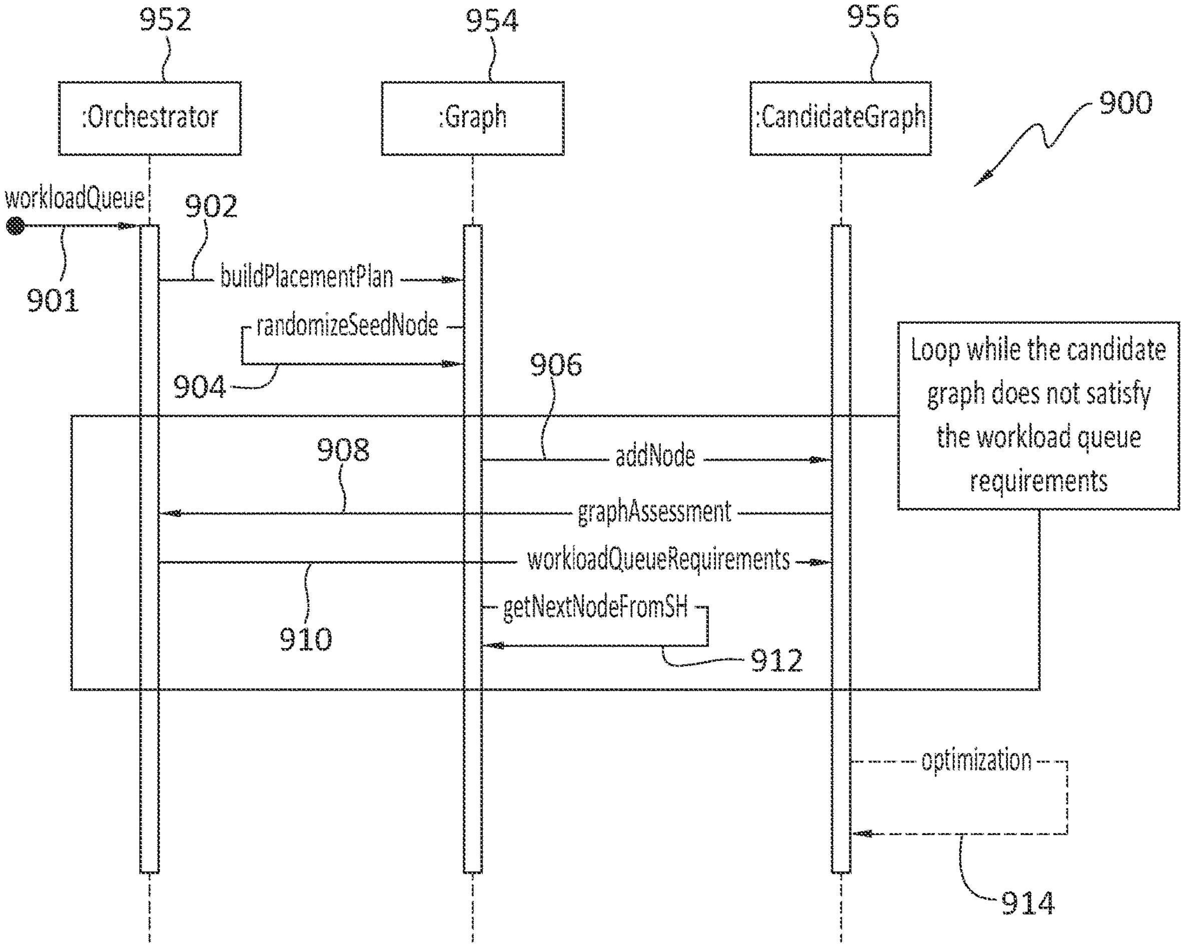
FIG. 9 discloses an overall sequence diagram, according to one embodiment.

It is noted with respect to the disclosed methods, including the example method of FIG. 9, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 9, a method 900, and associated pipeline, according to one embodiment is disclosed. As shown, the method 900 may be cooperatively performed by and/or in conjunction with various entities and elements such as, but not limited to, an orchestrator 952, graph 954, and candidate graph 956.

In this example embodiment, the pipeline is described as follows: (Step 1—workloadQueue) once the orchestrator receives 901 the workloads that must be placed, the orchestrator (Step 2—buildPlacementPlan) triggers 902 the method for building the placement plan. In traditional approaches, an optimization method would gather all the workloads requirements and infrastructure resources, build the constraints, and run the optimizer. However, one embodiment (Step 3—randomizeSeedNode) randomizes 904 a seed node from the infrastructure graph. This (Step 4—addNode) node is added 906 to a graph that contains the nodes that are capable of running the identified workloads, which is (Step 5—graphAssessment) evaluated 908 in the next step. If the current CandidateGraph (Step 6—workloadQueueRequirements) contains all the resources needed to run the set of workloads (such information is provided 910 by the Orchestrator), the process stops. Otherwise, we (Step 7—getNextNodeFromSH) rely on an SH solution to get 912 a new node from the set of neighbors of the previous node with higher probability of coping with the requirements of the workload queue. The process is repeated from Steps 4 to 6 (906 to 910). After the end of this loop, (Step 9—optimization) the optimization method is called 914 considering only the nodes in CandidateGraph as possible states.

E. Example Algorithm for Solving the SH Search Problem

Various approaches may be employed, in conjunction with one or more embodiments, to solve the SH search problem. Following is an example of one such approach, the D3TS Algorithm, which is disclosed in "F. Murai, D. Rennó, B. Ribeiro, G. Pappa, D. Towsley and K. Gile, '*Selective harvesting over networks,' Data Mining and Knowledge Discovery*, no. 32, pp. 187-217, 2018" ("Murai"), which is incorporated herein in its entirety by this reference.

SH was first introduced in Murai, where SH authors discussed some methods that can be adapted to solve this problem. In addition, the authors proposed the Directed Diversity Dynamic Thompson Sampling—D3TS, a Multi-Armed Bandit (MAB) algorithm for non-stationary stochastic processes that combines different classifiers and intelligently selects a classifier at each step to decide which neighbor to query next in a harvesting search scenario.

Directed Diversity Dynamic Thompson Sampling—D3TS is a classifier for SH. D3TS is a Multi-Armed Bandit (MAB) algorithm for non-stationary stochastic processes that combines different classifiers and intelligently selects a classifier at each step to decide which neighbor to query. This approach differs from ensemble techniques in that classifier responses are not combined.

D3TS adapts Dynamic Thompson Sampling (DTS) algorithm proposed for MABs with non-stationary distributions to the SH problem. DTS is based on the Thompson Sampling (TS) algorithm for stochastic MABs, where binary outcomes associated with each arm are modeled as Bernoulli trials. The uncertainty on the probability parameter associated with each arm k is typically modeled as a Beta (Beta(αk, βk)) distribution. The Beta distribution is the conjugate prior for the Bernoulli distribution, thus providing computational savings on Bayesian updates. TS performs exploration by choosing arms probabilistically, according to samples drawn from the corresponding distributions.

F. Further Example Embodiments

Following are some further example embodiments of the invention. These are presented only by way of example and are not intended to limit the scope of the invention in any way.

Embodiment 1. A method, comprising: building an infrastructure graph comprising nodes and edges, and each node represents a respective infrastructure, and each edge encodes information about aspects of a network that includes the nodes; applying a selective harvesting (SH) algorithm to the infrastructure graph to identify the nodes that are able to meet the requirements of a workload, and the nodes that are identified collectively form a subset of all the nodes of the infrastructure graph; based on the applying, generating a subgraph of the infrastructure graph, and the subgraph comprises the subset; and applying a workload placement optimization algorithm to the nodes of the subgraph.

Embodiment 2. The method as recited in any preceding embodiment, wherein each of the nodes is associated with respective computing resources.

Embodiment 3. The method as recited in any preceding embodiment, wherein each edge is directed to those nodes that have a direct connection to a communication network.

Embodiment 4. The method as recited in any preceding embodiment, wherein the SH algorithm is applied to a random set of nodes of the infrastructure graph.

Embodiment 5. The method as recited in any preceding embodiment, wherein a query budget constraint determines a minimum number of nodes to which the SH algorithm is applied.

Embodiment 6. The method as recited in any preceding embodiment, wherein all the nodes in the subgraph are able to support the workload.

Embodiment 7. The method as recited in any preceding embodiment, wherein the selective harvesting (SH) algorithm is iteratively applied until enough nodes are identified to support the workload.

Embodiment 8. The method as recited in any preceding embodiment, wherein the workload placement optimization algorithm is applied based on the infrastructure subgraph, and based on the workload and associated tasks.

Embodiment 9. The method as recited in any preceding embodiment, wherein the workload placement optimization algorithm is able to identify nodes for placement of the workload more quickly in the nodes of the subgraph than if the workload placement optimization algorithm searched all the nodes of the entire infrastructure.

Embodiment 10. The method as recited in any preceding embodiment, wherein the applying of the selective harvesting (SH) algorithm is performed in response to a user request to execute the workload.

Embodiment 11. A system, comprising hardware and/or software, operable to perform any of the operations, methods, or processes, or any portion of any of these, disclosed herein.

Embodiment 12. A non-transitory medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
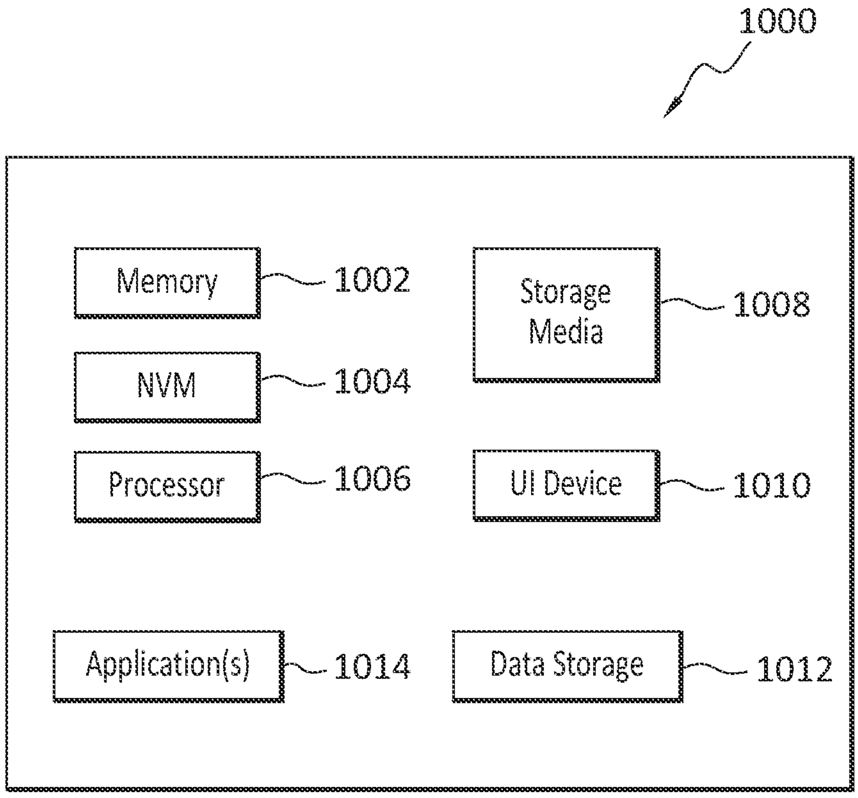
FIG. 10 discloses a computing entity operable to perform any of the disclosed methods, processes, and operations.

With reference briefly now to FIG. 10, any one or more of the entities disclosed, or implied, by FIGS. 1-9, and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

building an infrastructure graph comprising nodes and edges, and each node represents a respective infrastructure, and each edge encodes information about aspects of a network that includes the nodes;

applying a selective harvesting (SH) algorithm to the infrastructure graph, wherein the infrastructure graph is partially observed, wherein the SH algorithm is initialized from a seed set of nodes and iteratively queries additional nodes under a query budget constraint to identify nodes that are able to meet requirements of a workload, wherein the queries are based at least in part on observed node attributes, wherein the nodes that are identified are discovered through the iterative querying, wherein the nodes that are identified collectively form a subset of all the nodes of the infrastructure graph, wherein querying a node reveals connectivity or attributes of nodes that were not previously observed in the partially observed infrastructure graph;

based on the applying, generating a subgraph of the infrastructure graph, and the subgraph comprises the subset; and applying a workload placement optimization algorithm to the nodes of the subgraph, wherein the workload placement optimization algorithm searches only the nodes of the subgraph rather than all nodes of the infrastructure graph.

2. The method as recited in claim 1, wherein each of the nodes is associated with respective computing resources.

3. The method as recited in claim 1, wherein each edge is directed to those nodes that have a direct connection to a communication network.

4. The method as recited in claim 1, wherein the SH algorithm is applied to a random set of nodes of the infrastructure graph.

5. The method as recited in claim 1, wherein a query budget constraint determines a minimum number of nodes to which the SH algorithm is applied and wherein all the nodes in the subgraph are able to support the workload.

6. The method as recited in claim 1, wherein the selective harvesting (SH) algorithm is iteratively applied until enough nodes are identified to support the workload.

7. The method as recited in claim 1, wherein the workload placement optimization algorithm is applied based on the infrastructure subgraph, and based on the workload and associated tasks.

8. The method as recited in claim 1, wherein the workload placement optimization algorithm is able to identify nodes for placement of the workload more quickly in the nodes of the subgraph than if the workload placement optimization algorithm searched all the nodes of an entire infrastructure.

9. The method as recited in claim 1, wherein the applying of the selective harvesting (SH) algorithm is performed in response to a user request to execute the workload.

10. A non-transitory storage medium having stored therein instructions that are executable by one or more hardware processors to perform operations comprising:

building an infrastructure graph comprising nodes and edges, and each node represents a respective infrastructure, and each edge encodes information about aspects of a network that includes the nodes;

applying a selective harvesting (SH) algorithm to the infrastructure graph, wherein the infrastructure graph is partially observed, wherein the SH algorithm is initialized from a seed set of nodes and iteratively queries additional nodes under a query budget constraint to identify nodes that are able to meet requirements of a workload, wherein the queries are based at least in part on observed node attributes, wherein the nodes that are identified are discovered through the iterative querying, wherein the nodes that are identified collectively form a subset of all the nodes of the infrastructure graph, wherein querying a node reveals connectivity or attributes of nodes that were not previously observed in the partially observed infrastructure graph;

based on the applying, generating a subgraph of the infrastructure graph, and the subgraph comprises the subset; and applying a workload placement optimization algorithm to the nodes of the subgraph, wherein the workload placement optimization algorithm searches only the nodes of the subgraph rather than all nodes of the infrastructure graph.

11. The non-transitory storage medium as recited in claim 10, wherein each of the nodes is associated with respective computing resources.

12. The non-transitory storage medium as recited in claim 10, wherein each edge is directed to those nodes that have a direct connection to a communication network.

13. The non-transitory storage medium as recited in claim 10, wherein the SH algorithm is applied to a random set of nodes of the infrastructure graph.

14. The non-transitory storage medium as recited in claim 10, wherein a query budget constraint determines a minimum number of nodes to which the SH algorithm is applied.

15. The non-transitory storage medium as recited in claim 10, wherein all the nodes in the subgraph are able to support the workload.

16. The non-transitory storage medium as recited in claim 10, wherein the selective harvesting (SH) algorithm is iteratively applied until enough nodes are identified to support the workload.

17. The non-transitory storage medium as recited in claim 10, wherein the workload placement optimization algorithm is applied based on the infrastructure subgraph, and based on the workload and associated tasks.

18. The non-transitory storage medium as recited in claim 10, wherein the workload placement optimization algorithm is able to identify nodes for placement of the workload more quickly in the nodes of the subgraph than if the workload placement optimization algorithm searched all the nodes of an entire infrastructure.

19. The non-transitory storage medium as recited in claim 10, wherein the applying of the selective harvesting (SH) algorithm is performed in response to a user request to execute the workload.

20. A method comprising:

building an infrastructure graph comprising nodes and edges, and each node represents a respective infrastructure, and each edge encodes information about aspects of a network that includes the nodes;

applying a selective harvesting (SH) algorithm to the infrastructure graph to identify the nodes that are able to meet requirements of a workload, and the nodes that are identified collectively form a subset of all the nodes of the infrastructure graph, wherein the SH algorithm is applied to a random set of nodes of the infrastructure graph;

based on the applying, generating a subgraph of the infrastructure graph, and the subgraph comprises the subset; and applying a workload placement optimization algorithm to the nodes of the subgraph.

* * * * *